(12) United States Patent
Skafidas et al.

(10) Patent No.: US 12,461,003 B2
(45) Date of Patent: *Nov. 4, 2025

(54) BIOLOGICAL FLUID SAMPLE ASSESSMENT

(71) Applicant: MX3 Diagnostics, Inc., Austin, TX (US)

(72) Inventors: Efstratios Skafidas, Thornbury (AU); Hsien Ming, Footscray (AU); You Liang, Carlton (AU); Duc Huynh, Lalor (AU); Thanh Nguyen, Sunshine West (AU); Michael Erlichster, Caulfield North (AU)

(73) Assignee: MX3 Diagnostics, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,722

(22) Filed: May 31, 2023

(65) Prior Publication Data

US 2024/0151623 A1 May 9, 2024

Related U.S. Application Data

(63) Continuation of application No. 17/159,770, filed on Jan. 27, 2021, now Pat. No. 11,703,436.

(Continued)

(51) Int. Cl.
 *G01N 11/02* (2006.01)
 *G01N 33/487* (2006.01)
 (Continued)

(52) U.S. Cl.
 CPC ....... *G01N 11/02* (2013.01); *G01N 33/48707* (2013.01); *G01N 33/49* (2013.01); *G01N 33/493* (2013.01)

(58) Field of Classification Search
 CPC ................. G01N 11/02; G01N 33/493; G01N 33/48707; G01N 33/49; G01N 11/04; G01N 33/487
 (Continued)

(56) References Cited

U.S. PATENT DOCUMENTS 3,947,328 A 3/1976 Friedenberg et al.
3,979,274 A 9/1976 Newman
(Continued)

FOREIGN PATENT DOCUMENTS

CN 109682878 A 4/2019
EP 1710565 A1 10/2006
(Continued)

OTHER PUBLICATIONS

"Cepheid and Sherlock Biosciences Establish Collaboration on New GeneXpert Tests for Infectious Diseases and Oncology Leveraging CRISPR Technology, http://cepheid.mediaroom.com/2020-02-28-Cepheid-and-Sherlock-Biosciences-Establish-Collaboration-on-New-GeneXpert-Tests-for-Infectious-Diseases-and-Oncology-Leveraging-CRISPR-Technology, 3 pages (Feb. 28, 2020)."

(Continued)

*Primary Examiner* — Robert R Raevis
(74) *Attorney, Agent, or Firm* — Knobbe, Martens, Olson & Bear LLP

(57) ABSTRACT

A method of assessing a bodily fluid sample on a test strip may involve applying a periodic signal with a first electrode located at a first location in a microfluidic channel of the test strip, monitoring the applied periodic signal with a second electrode located at a second location in the microfluidic channel, and using a third electrode located at a third location in the microfluidic channel as a reference electrode. The method may also include: collecting the bodily fluid sample in the microfluidic channel; continuing to apply the (Continued)

periodic signal, monitor the periodic signal and use the third electrode as a reference electrode while collecting the bodily fluid sample; and determining that the bodily fluid sample is sufficient for analyzing, based at least in part on the applied and monitored periodic signal.

19 Claims, 3 Drawing Sheets

Related U.S. Application Data

(60) Provisional application No. 62/967,694, filed on Jan. 30, 2020.

(51) Int. Cl.
 *G01N 33/49* (2006.01)
 *G01N 33/493* (2006.01)

(58) Field of Classification Search
 USPC ........... 73/54.02, 54.01, 54.07, 54.08, 64.56, 73/61.61, 61.59, 61.41, 61, 43, 863, 73/861.05, 198; 600/300; 324/693, 694, 324/697, 705, 706, 717
 See application file for complete search history.

(56) References Cited

U.S. PATENT DOCUMENTS

| | | |
|---|---|---|
| 4,454,007 A | 6/1984 | Pace |
| 5,222,936 A | 6/1993 | Stephen et al. |
| 5,282,950 A | 2/1994 | Dietze et al. |
| 5,582,697 A | 12/1996 | Ikeda et al. |
| 5,685,319 A | 11/1997 | Marett |
| 5,714,341 A | 2/1998 | Thieme et al. |
| 5,776,783 A | 7/1998 | Kell |
| 5,908,788 A | 6/1999 | Kell |
| 6,086,748 A | 7/2000 | Durst et al. |
| 6,102,872 A | 8/2000 | Doneen et al. |
| 6,315,951 B1 | 11/2001 | Markart |
| 6,377,896 B1 | 4/2002 | Sato et al. |
| 6,464,848 B1 | 10/2002 | Matsumoto |
| 6,554,982 B1 | 4/2003 | Shin et al. |
| 8,399,259 B2 | 3/2013 | Fukunaga et al. |
| 8,465,635 B2 | 6/2013 | Thuerlemann et al. |
| 9,546,973 B2 | 1/2017 | McIlrath |
| 9,713,440 B2 | 7/2017 | Hurd et al. |
| 10,197,523 B2 | 2/2019 | Huang et al. |
| 10,258,278 B2 | 4/2019 | Howell et al. |
| 10,989,724 B1 | 4/2021 | Holmes et al. |
| 11,219,410 B2 | 1/2022 | Cheuvront |
| 11,690,566 B2 | 7/2023 | Skafidas et al. |
| 11,701,036 B2 | 7/2023 | Nguyen et al. |
| 11,703,436 B2 * | 7/2023 | Skafidas ............... G01N 33/49 73/54.02 |
| 12,019,045 B2 | 6/2024 | Abeyrathne et al. |
| 12,123,865 B2 | 10/2024 | Erlichster et al. |
| 2001/0032785 A1 | 10/2001 | Cha et al. |
| 2002/0011408 A1 | 1/2002 | Lee et al. |
| 2002/0039783 A1 | 4/2002 | McMillan et al. |
| 2002/0060247 A1 | 5/2002 | Krishnaswamy et al. |
| 2002/0065332 A1 | 5/2002 | Choi et al. |
| 2003/0150745 A1 | 8/2003 | Teodorczyk et al. |
| 2003/0159948 A1 | 8/2003 | Benco et al. |
| 2003/0171697 A1 | 9/2003 | Smith et al. |
| 2003/0213691 A1 | 11/2003 | Peper et al. |
| 2004/0173458 A1 | 9/2004 | Noda et al. |
| 2004/0232009 A1 | 11/2004 | Okuda et al. |
| 2004/0238358 A1 | 12/2004 | Forrow et al. |
| 2004/0256248 A1 | 12/2004 | Burke et al. |
| 2005/0023152 A1 | 2/2005 | Surridge et al. |
| 2005/0143675 A1 | 6/2005 | Neel et al. |
| 2005/0201895 A1 | 9/2005 | Donsky |
| 2005/0279647 A1 | 12/2005 | Beaty |
| 2006/0137980 A1 | 6/2006 | Lauks et al. |
| 2006/0175205 A1 | 8/2006 | Cui et al. |
| 2007/0015287 A1 | 1/2007 | Robbins et al. |
| 2007/0048224 A1 | 3/2007 | Howell et al. |
| 2007/0073127 A1 | 3/2007 | Kiani et al. |
| 2007/0098600 A1 | 5/2007 | Kayyem |
| 2007/0227911 A1 | 10/2007 | Wang et al. |
| 2007/0272564 A1 | 11/2007 | Huang |
| 2008/0118397 A1 | 5/2008 | Slowey et al. |
| 2008/0173552 A1 | 7/2008 | Wu et al. |
| 2008/0247910 A1 | 10/2008 | Weekamp et al. |
| 2008/0257754 A1 | 10/2008 | Pugia et al. |
| 2009/0024060 A1 | 1/2009 | Darrigrand et al. |
| 2009/0045076 A1 | 2/2009 | Burke et al. |
| 2009/0173629 A1 | 7/2009 | Kidwell |
| 2010/0012490 A1 | 1/2010 | Hsu |
| 2010/0176006 A1 | 7/2010 | Bickford et al. |
| 2010/0210023 A1 | 8/2010 | Wong et al. |
| 2010/0249652 A1 | 9/2010 | Rush et al. |
| 2011/0162978 A1 | 7/2011 | Cardosi et al. |
| 2011/0175704 A1 | 7/2011 | Tesini et al. |
| 2011/0268626 A1 | 11/2011 | Slowey et al. |
| 2012/0067741 A1 | 3/2012 | Kranendonk et al. |
| 2012/0083711 A1 | 4/2012 | Goldstein et al. |
| 2012/0109011 A1 | 5/2012 | Cogan et al. |
| 2012/0165626 A1 | 6/2012 | Irina et al. |
| 2012/0215662 A1 | 8/2012 | Ito |
| 2012/0282616 A1 | 11/2012 | Zeijlstra et al. |
| 2012/0289863 A1 | 11/2012 | Goldstein et al. |
| 2013/0069120 A1 | 3/2013 | Merz et al. |
| 2013/0102082 A1 | 4/2013 | Majima et al. |
| 2013/0199944 A1 | 8/2013 | Petisee |
| 2013/0233061 A1 | 9/2013 | Sullivan |
| 2013/0276521 A1 | 10/2013 | Fuerst et al. |
| 2013/0341186 A1 | 12/2013 | Hsu |
| 2014/0105788 A1 | 4/2014 | Iwamoto et al. |
| 2014/0125183 A1 | 5/2014 | Takahashi |
| 2014/0251833 A1 | 9/2014 | Smith et al. |
| 2014/0273187 A1 | 9/2014 | Johnson et al. |
| 2014/0277291 A1 | 9/2014 | Pugh et al. |
| 2014/0297198 A1 | 10/2014 | Wada et al. |
| 2014/0326037 A1 | 11/2014 | Fukuda et al. |
| 2014/0329705 A1 | 11/2014 | Wong et al. |
| 2014/0364758 A1 | 12/2014 | Schindhelm et al. |
| 2015/0088538 A1 | 3/2015 | Dykes et al. |
| 2015/0091592 A1 | 4/2015 | Elder |
| 2015/0216471 A1 | 8/2015 | Goldstein et al. |
| 2015/0217115 A1 | 8/2015 | Avitall |
| 2015/0226695 A1 | 8/2015 | Bakker et al. |
| 2015/0226752 A1 | 8/2015 | Nazareth et al. |
| 2015/0241455 A1 | 8/2015 | Parsons |
| 2015/0289790 A1 | 10/2015 | Swenson |
| 2015/0359458 A1 | 12/2015 | Erickson et al. |
| 2016/0011178 A1 | 1/2016 | Hoenes et al. |
| 2016/0045144 A1 | 2/2016 | Bansal et al. |
| 2016/0074019 A1 | 3/2016 | Hata et al. |
| 2016/0077050 A1 | 3/2016 | Wu et al. |
| 2016/0120468 A1 | 5/2016 | Mathew et al. |
| 2016/0266102 A1 | 9/2016 | Knopfmacher |
| 2016/0320326 A1 | 11/2016 | Zevenbergen et al. |
| 2016/0361001 A1 | 12/2016 | Tai et al. |
| 2017/0014822 A1 | 1/2017 | Ker |
| 2017/0067889 A1 | 3/2017 | Tamir |
| 2017/0138962 A1 | 5/2017 | Southern |
| 2017/0226557 A1 | 8/2017 | Wang et al. |
| 2017/0261461 A1 | 9/2017 | Bychkova et al. |
| 2017/0327865 A1 | 11/2017 | Leung et al. |
| 2018/0125400 A1 | 5/2018 | Yang et al. |
| 2018/0220947 A1 | 8/2018 | Bedell, Jr. |
| 2019/0131009 A1 | 5/2019 | Som et al. |
| 2020/0011851 A1 | 1/2020 | Piasio et al. |
| 2020/0116664 A1 | 4/2020 | Abeyrathne et al. |
| 2020/0383582 A1 | 12/2020 | Bychkov |
| 2021/0005233 A1 | 1/2021 | Kim et al. |
| 2021/0005322 A1 | 1/2021 | Huynh et al. |
| 2021/0215662 A1 | 7/2021 | Erlichster et al. |
| 2021/0223239 A1 | 7/2021 | De et al. |
| 2022/0013212 A1 | 1/2022 | Tseng et al. |
| 2022/0122743 A1 | 4/2022 | Erlichster et al. |

(56) References Cited

U.S. PATENT DOCUMENTS

| | | |
|---|---|---|
| 2022/0143609 A1 | 5/2022 | Xu et al. |
| 2024/0122536 A1 | 4/2024 | Skafidas et al. |
| 2024/0138723 A1 | 5/2024 | Nguyen et al. |
| 2025/0001408 A1 | 1/2025 | Abeyrathne et al. |
| 2025/0102458 A1 | 3/2025 | Abeyrathne et al. |

FOREIGN PATENT DOCUMENTS

| | | |
|---|---|---|
| EP | 1860432 A1 | 11/2007 |
| EP | 2075339 A1 | 7/2009 |
| EP | 2584358 A1 | 4/2013 |
| EP | 2965074 A1 | 1/2016 |
| JP | 06-082442 A | 3/1994 |
| JP | 11-194108 A | 7/1999 |
| JP | 2002-540424 A | 11/2002 |
| JP | 2003-156469 A | 5/2003 |
| JP | 2003-215132 A | 7/2003 |
| JP | 2003-526108 A | 9/2003 |
| JP | 2005-241537 A | 9/2005 |
| JP | 2006-508349 A | 3/2006 |
| JP | 2006-215034 A | 8/2006 |
| JP | 2007-017442 A | 1/2007 |
| JP | 2007-524826 A | 8/2007 |
| JP | 2009-503452 A | 1/2009 |
| JP | 2009-535651 A | 10/2009 |
| JP | 4582076 B2 | 11/2010 |
| JP | 2013-101102 A | 5/2013 |
| JP | 2013-531792 A | 8/2013 |
| JP | 2014-095692 A | 5/2014 |
| JP | 2014-209095 A | 11/2014 |
| JP | 2017-500548 A | 1/2017 |
| JP | 2017-532571 A | 11/2017 |
| KR | 10-2016-0035584 A | 3/2016 |
| KR | 10-2017-0072188 A | 6/2017 |
| KR | 10-2018-0002231 A | 1/2018 |
| KR | 10-2019-0127349 A | 11/2019 |
| WO | 98/12557 A1 | 3/1998 |
| WO | 00/58720 A1 | 10/2000 |
| WO | 01/67079 A1 | 9/2001 |
| WO | 03/08956 A1 | 1/2003 |
| WO | 2004/051251 A1 | 6/2004 |
| WO | 2007/126920 A1 | 11/2007 |
| WO | 2007/131036 A1 | 11/2007 |
| WO | 2010/045247 A1 | 4/2010 |
| WO | 2011/075711 A1 | 6/2011 |
| WO | 2012/012135 A2 | 1/2012 |
| WO | 2013/075711 A1 | 5/2013 |
| WO | 2014/176753 A1 | 11/2014 |
| WO | 2015/075169 A1 | 5/2015 |
| WO | 2016/069935 A1 | 5/2016 |
| WO | 2018/004191 A1 | 1/2018 |
| WO | 2018/191322 A1 | 10/2018 |

OTHER PUBLICATIONS

"Cepheid, Xpert Carba-R, GXCARBAR-10, https://www.cepheid.com/Package%20Insert20Files/Xpert-Carba-R-RX-Only-US-IVD-ENGLISH-Package-Insert-301-2438-Rev-F.pdf, Rev. F, 54 pages (Aug. 2019)."

Buhlmann, P. et al., "Carrier-Based Ion-Selective Electrodes and Bulk Opotodes. 2. Ionophores for Potentiometric and Optical Sensors", Chem. Rev., Jun. 1998, vol. 98(4), pp. 1593-1688.

Drain, P. et al., "The arrival of a true point-of-care molecular assay-ready for global implementation?", Nov. 1, 2015 (Nov. 1, 2015), pp. e663-e664, XP055830065.

Elmes, R.B.P. et al., "Anion recognition by cyclic peptides", Chem. Commun., 2015, vol. 51(24), pp. 4951-4968.

Erlichster et al., "Pan-Family Assays for Rapid Viral Screening: Reducing Delays in Public Health Responses During Pandemics", Clinical Infectious Diseases, Jul. 20, 2020 (Jul. 20, 2020), pp. 1-6, XP055830068.

International Preliminary Report on Patentability received for PCT Patent Application No. PCT/US2021/015282, mailed on Aug. 11, 2022, 5 pages.

International Search Report and Written Opinion for PCT Application No. PCT/US2021/015282, mailed May 25, 2021, 9 pages.

Joseph, C., et al., "Use of an algorithm applied to urine drug screening to assess adherence to an oxycontin regimen", Journal of Opioid Management, vol. 5, No. 6, Nov. 1, 2009, pp. 359-364.

Kafidas et al., "Biological Fluid Sample Assessment," U.S. Appl. No. 62/967,694, filed Jan. 30, 2020, 21 pages.

Moya, A., et al., "Flexible Microfluidic Bio-Lab-on-a-Chip Multi-Sensor Platform for Electrochemical Measurements", Sensors, 2014 IEEE, pp. 1018-1021 (Year: 2014).

Nguyen et al., "Saliva Test Strip and Method" U.S. Appl. No. 62/872,339, filed Jul. 10, 2019, 31 pages.

Oncescu et al., "Smartphone based health accessory for colorimetric detection of biomarkers in sweat and saliva," Lab on a Chip 13(16):3232-3238, Jun. 7, 2013.

Nayak, S. et al., "Point-of-Care Diagnostics: Recent Developments in a Connected Age", Analytical Chemistry, 2017, vol. 89 (1), pp. 102-123.

Watson M "Three Types of Supply Chain Buffers", Sep. 30, 2013. Supply Chain Digest. https://www.scdigest.com/experts/DrWatson_13-09-30.php?cid=7451 (Year: 2013).

Carroll, H. A., et al., "An investigation into the relationship between plain water intake and glycated Hb (HbA 1 c): a sex-stratified, cross-sectional analysis of the UK National Diet and Nutrition Survey (2008-2012)", British Journal of Nutrition, vol. 116, No. 10, Nov. 10, 2016, pp. 1770-1780.

Erlichster et al., "Assessment of Biomarker Concentration in a Fluid," U.S. Appl. No. 62/961,438, filed Jan. 15, 2020, 22 pages.

Erlichster et al., "Personalized Hydration Assessment and Fluid Replenishment," U.S. Appl. No. 62/876,263, filed Jul. 19, 2019, 30 pages.

Erlichster et al., "Personalized Hydration Assessment and Fluid Replenishment," U.S. Appl. No. 62/957,527, filed Jan. 6, 2020, 35 pages.

Yousri et al., "A systems view of type 2 diabetes-associated metabolic perturbations in saliva, blood and urine at different timescales of glycaemic control", Diabetologia, vol. 58, 2015, pp. 1855-1867.

* cited by examiner

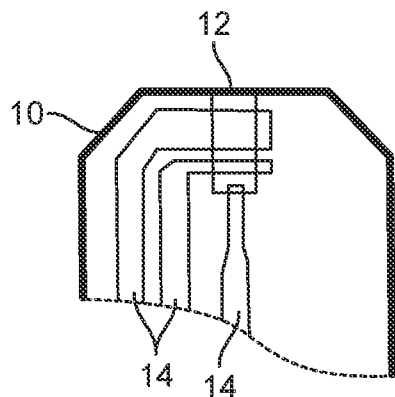
FIG. 1A
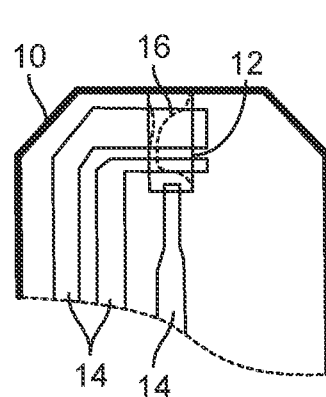
FIG. 1B
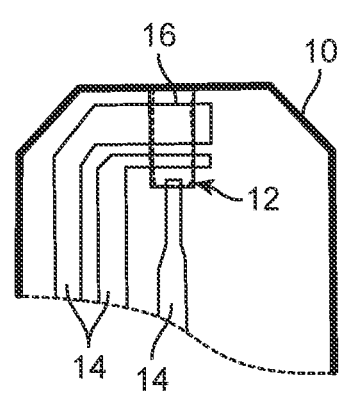
FIG. 1C
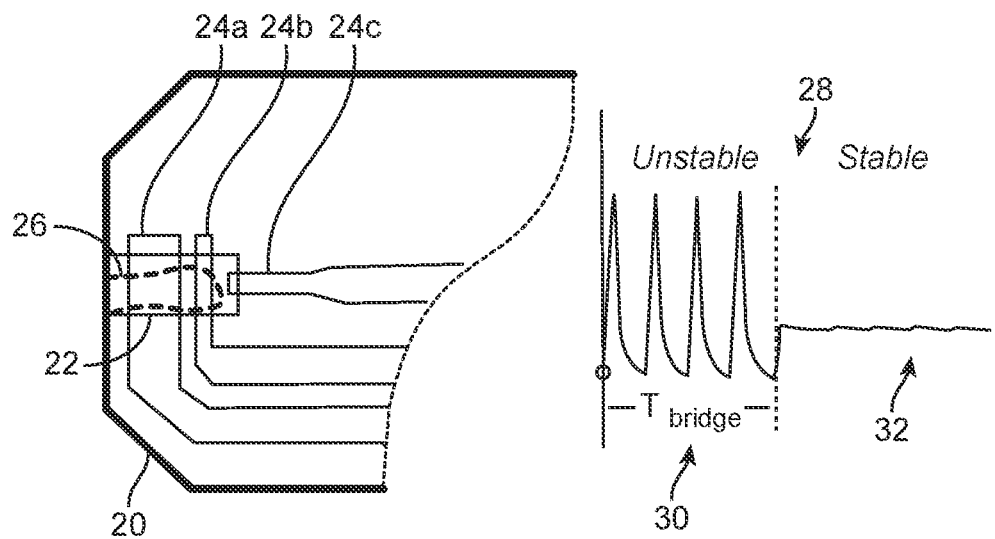
FIG. 2A
FIG. 2B

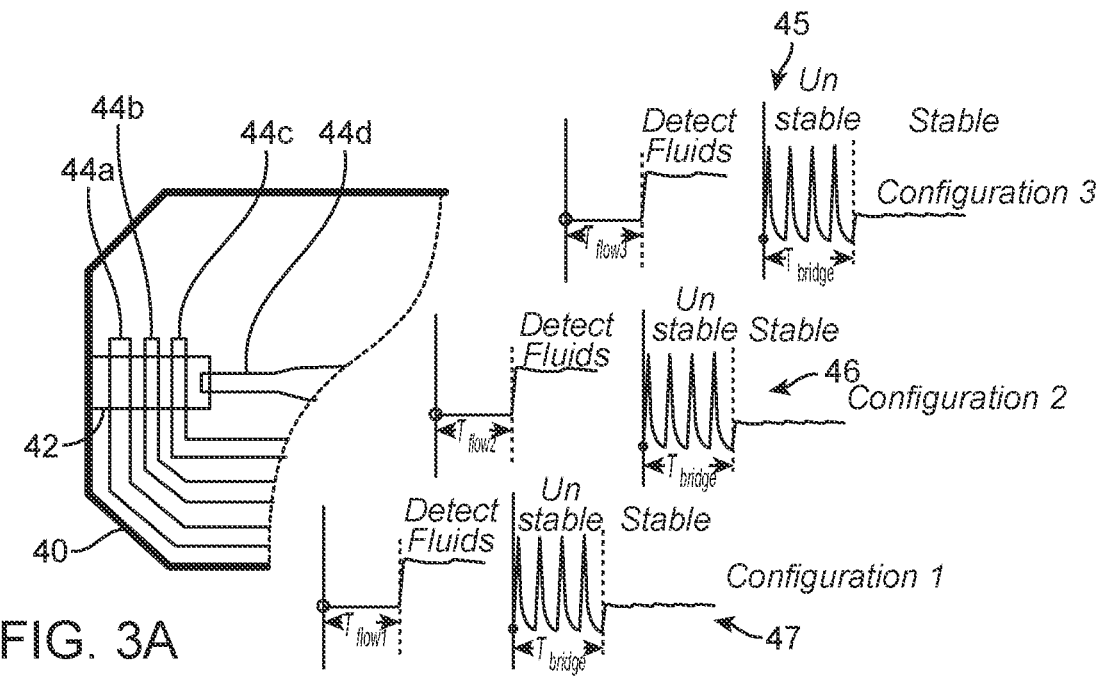
FIG. 3A
FIG. 3B
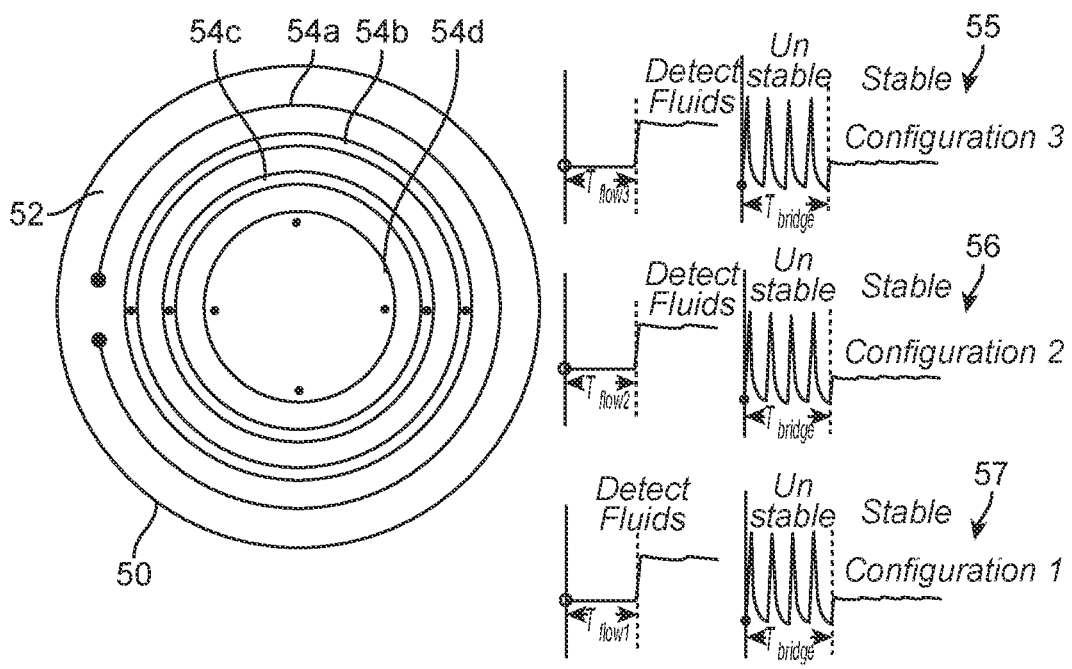
FIG. 4A
FIG. 4B

BIOLOGICAL FLUID SAMPLE ASSESSMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This application describes biomedical systems and methods. More specifically, the application describes a method and system for assessing a bodily fluid sample to determine if it is sufficient for testing.

Description of the Related Art

Appropriate hydration in the human body is vital for health and proper functioning of the body organs. Water is lost from the body during respiration, perspiration and urination. Fluid loss of just a few percent can negatively impact cardiovascular function, thermal dissipation, and exercise performance. Dehydration can cause headaches, light-headedness, dizziness, fainting and in extreme cases delirium, unconsciousness or death. Hyponatremia ("over-hydration") can also detrimentally affect the body's functioning, particularly during exercise, and can even lead to death in extreme cases.

Dehydration is an excessive loss of body fluid. In physiological terms, dehydration may entail a deficiency of fluid within an organism. Dehydration can be caused by losing too much fluid, not drinking enough fluids, or both. Vomiting, diarrhea, and excessive perspiration without sufficient liquid intake are other causes of dehydration, which may be particularly worrisome for athletes and people that work under hot, dry conditions. There are three main types of dehydration: hypotonic (primarily a loss of electrolytes, especially sodium), hypertonic (primarily a loss of water), and isotonic (equal loss of water and electrolytes). While isotonic dehydration is the most common, distinction between the three types of dehydration may be important for administering proper treatment.

Relying on thirst as a feedback mechanism to trigger demand for fluid intake may not be adequate to maintain an optimal hydration level, since a sensation of thirst sufficient to cause a subject to drink is often not triggered until after the subject is already dehydrated. This is why marathon runners, for example, are always told to "drink before you feel thirsty." At the same time, drinking too much water during an endurance event like a marathon can lead to hyponatremia, which has led to a number of deaths during such events in the past. Unfortunately, there are currently no practical, affordable, non-invasive devices for measuring a person's hydration level. Measurement devices are typically large and/or expensive devices housed in laboratories, which use blood or urine to measure hydration. This makes measuring hydration impractical, invasive, and/or prohibitively expensive.

Additionally, many other physiological parameters and levels of various substances in the human or animal body are frequently tested or would be desirable to test for. Unfortunately, it is often necessary to sample blood, urine or other bodily substances, such as cerebrospinal fluid, to measure these parameters. Some physiological parameters involve even more invasive or costly measurement techniques.

Therefore, it would be highly beneficial to have a practical, affordable, non-invasive system and method for measuring a person's hydration level. It would also be very desirable to have practical, affordable, non-invasive systems and methods for testing other parameters in the body.

Point-of-care testing systems allow for measurement of biomarkers (e.g., metabolites, hormones, and electrolytes) in biological samples outside of a laboratory, such as a in a clinic or personal residence. By reducing labor and transport costs, point-of-care testing is an attractive alternative to laboratory testing, especially for frequent or routine tests.

Conventional laboratory tests allow for extensive treatment and processing of samples, to normalize sample characteristics and remove any contaminants prior to analysis. With point-of-care tests, on the other hand, extensive sample processing is difficult if not impossible, due to the equipment, cost, and time required. Ideally, therefore, a point-of-care test would use an unprocessed sample, rather than a processed sample.

For some biological fluids, viscosity is strongly regulated by the body. Blood, for example is typically 3-4 centipoise (cP) in viscosity. In contrast, saliva viscosity is less regulated and can range from 1 to 10 cP, depending individual physiology, age, gender, health status, and diet. While this variability can be normalized through laboratory processing (e.g., freezing saliva precipitates mucins, which can then be removed through centrifugation), it presents challenges when designing tools that directly measure analytes in saliva through direct sampling (sampling from the oral cavity) or near-direct sampling (sampling from a recently collected sample).

One specific challenge in analyzing saliva samples using point-of-care systems is the presence of bubbles in the saliva samples. This is particularly the case in individuals with dryer mouths or highly viscous saliva. Bubbles may cause voids in the fluidic channels of a sample analysis device, resulting in blockages or aberrant measurements. Another challenge is the non-uniform flow of more viscous saliva, which may result in incomplete filling of the sampling fluidics.

It would therefore be desirable to develop a device, system and method for assessing whether a bodily fluid sample is adequate for measurement and analysis. Ideally, such devices, systems and methods would be sufficiently easy to use and cost effective to allow them to be used in a point-of-care setting, such as a home, office, gym, or the like, by an untrained user.

SUMMARY OF THE INVENTION

This application describes a device, system and method that use a continuous application of a periodic signal prior to and during sample collection by an electrode. The method also provides for continuous monitoring of the sample collection by a second electrode. Some embodiments also provide for assessment of signal fluctuation during sample collection. Typically, the method requires a period of signal consistency within set bounds prior to initiation of measurement. These features help ensure not only that a sample has completed a circuit between two electrodes prior to measurement initiation, but also that the fluid is no longer being collected and the collected fluid is no longer moving within the sampling fluidics.

In one aspect of the present disclosure, a method of assessing a bodily fluid sample on a test strip involves:

applying a periodic signal with a first electrode located at a first location in a microfluidic channel of the test strip; monitoring the applied periodic signal with a second electrode located at a second location in the microfluidic channel; and using a third electrode located at a third location in the microfluidic channel as a reference electrode, wherein each of the first electrode, the second electrode and the third electrode has a fixed function. The method further involves: collecting the bodily fluid sample in the microfluidic channel; continuing to apply the periodic signal, monitor the periodic signal and use the third electrode as a reference electrode, while collecting the bodily fluid sample; and determining that the bodily fluid sample is sufficient for analyzing, based at least in part on the applying and monitoring of the periodic signal.

In some embodiments, the periodic signal fluctuates depending on a volume of the bodily fluid sample and a movement of the bodily fluid sample through the microfluidic channel, and a period of stability in the monitored periodic signal is required before determining that the bodily fluid sample is sufficient. The method may further involve initiating an analysis of the bodily fluid sample, based on the determining step. Some embodiments may involve, before the determining step: determining that the bodily fluid sample is insufficient for analyzing; and indicating to a user to continue collecting more of the bodily fluid sample on the test strip. For example, determining that the bodily fluid sample is insufficient may involve identifying a period of instability or a period of stability of the monitored periodic signal, outside of an allowed range. Indicating to the user may involve providing an auditory signal, a vibration and/or a visual signal in a bodily fluid analysis device directly connected with the test strip or a separate device wireless connected with the bodily fluid analysis device. In various embodiments, the bodily fluid sample may be any suitable bodily fluid, such as but not limited to saliva, sweat, blood or urine.

In another aspect of the present disclosure, a method of assessing a bodily fluid sample on a test strip involves: applying a periodic signal with a first electrode located at a first location in a microfluidic channel of the test strip; monitoring the applied periodic signal with a second electrode located at a second location in the microfluidic channel; and using a third electrode located at a third location in the microfluidic channel as a reference electrode, wherein each of the first electrode, the second electrode and the third electrode has a reconfigurable function. The method further involves: collecting the bodily fluid sample in the microfluidic channel; continuing to apply the periodic signal, monitor the periodic signal and use the third electrode as a reference electrode, while collecting the bodily fluid sample; switching configurations of the first electrode, the second electrode and the third electrode, while collecting the bodily fluid sample; and determining that the bodily fluid sample is sufficient for analyzing, based at least in part on the applied and monitored periodic signal. In some embodiments, the method may further involve determining at least one of a sample flow rate and a sample viscosity, by comparing signals generated with various electrode configurations.

In another aspect of the present disclosure, a method of assessing consistency and reducing the sensitivity of a measurement of a bodily fluid sample on a test strip with at least four electrodes involves: applying a periodic signal with at least some of the at least four electrodes, wherein the at least four electrodes are located at different locations in a microfluidic sample chamber of the test strip; monitoring the periodic signal with at least some of the at least four electrodes; collecting the bodily fluid sample on the test strip; identifying a period of stability in the monitored signals; and initiating measurement of the bodily fluid sample, based on the identified period of stability.

Optionally, the method may also include determining a sample flow rate and a viscosity by comparing signals generated with various sets of electrodes. The method may also include recommending a method for collecting the bodily fluid sample to a user, based at least in part on the monitored signals.

These and other aspects and embodiments are described in greater detail below, in relation to the attached drawing figures.

BRIEF DESCRIPTION OF THE DRAWINGS

FIGS. 1A-1C illustrate one end of a saliva test strip, showing an empty microfluidic channel (FIG. 1A), a partially filled channel (FIG. 1B), and a filled channel (FIG. 1C);

FIG. 2A illustrates one end of a saliva test strip with a microfluidic channel partially filled with sample fluid, according to one embodiment;

FIG. 2B is a line graph illustrating a reading of a monitored electrode signal from the saliva test strip of FIG. 2A;

FIG. 3A illustrates one end of a saliva test strip with a microfluidic channel and four electrodes, according to one embodiment;

FIG. 3B includes multiple line graphs representing multiple readings of multiple monitored electrode signals from the saliva test strip of FIG. 3A;

FIG. 4A illustrates a saliva test strip with multiple concentric electrodes located within the microfluidics of the strip, according to one embodiment;

FIG. 4B includes multiple line graphs representing multiple readings of multiple monitored electrode signals from the saliva test strip of FIG. 4A.

DETAILED DESCRIPTION OF THE PREFERRED EMBODIMENT

Figure 5:
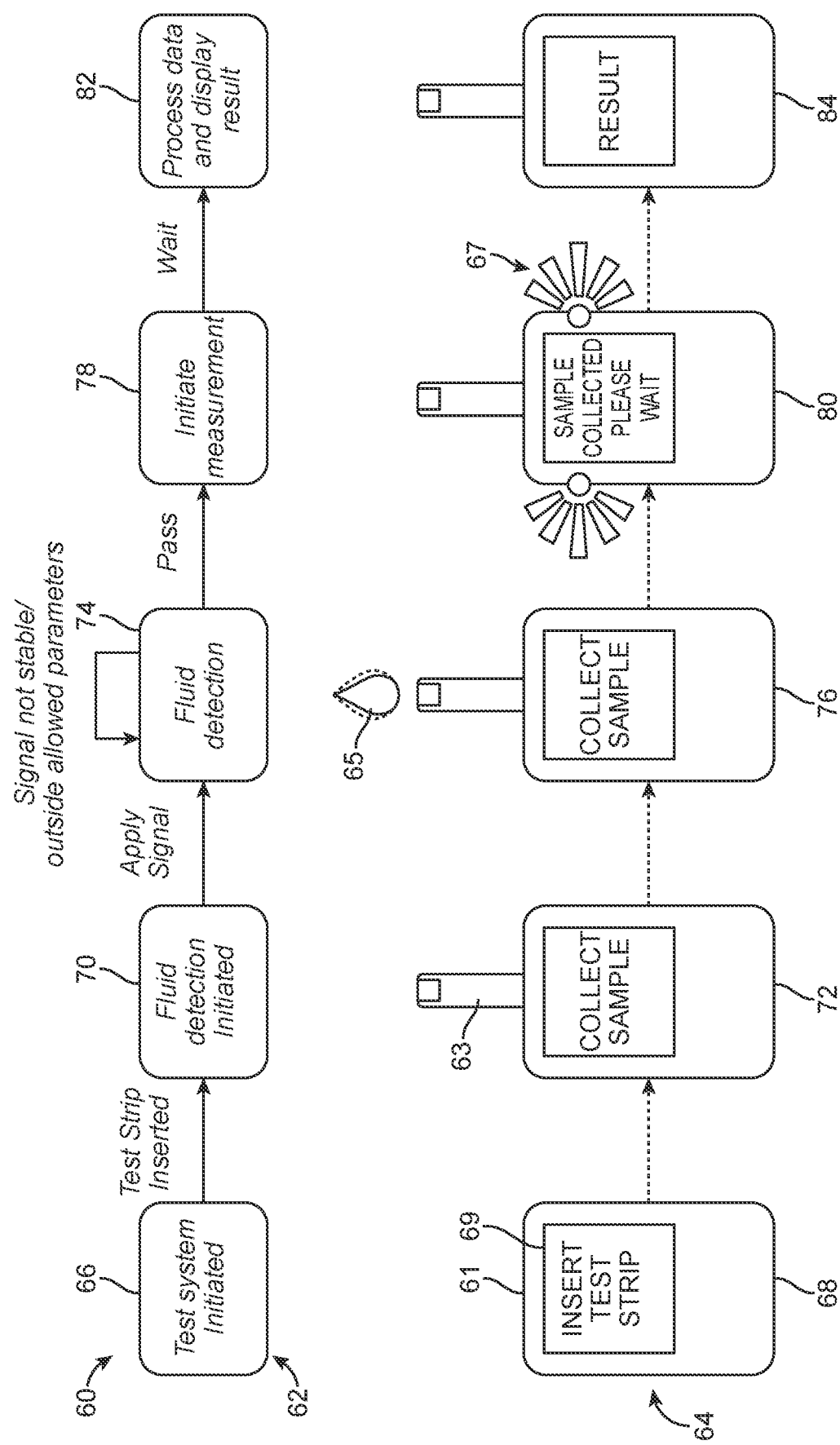
FIG. 5 is flow diagram illustrating a method for collecting and analyzing a bodily fluid sample and providing prompts and information to a user, according to one embodiment.

The assignee of the present application has filed previous patent applications describing systems, methods and devices for testing, measuring and analyzing saliva, to measure a subject's hydration level, as well as for measuring other substances (e.g., sweat) and/or physiological parameters in a human or animal subject. These previous patent applications include U.S. patent application Ser. No. 16/197,530 (U.S. Pub No. 2019/0150836), titled "Saliva Testing System," and filed Nov. 21, 2018; 62/744,389, titled "Ion Selective Sensor," and filed Oct. 11, 2018; and 62/872,339, titled "Saliva Test Strip and Method," and filed on Jul. 10, 2019. All of these patent applications are hereby incorporated by reference into the present application, and they may be referred to herein as "the Incorporated Applications."

The present application adds to the technologies in the Incorporated Applications by describing a method, device and system for determining whether a bodily fluid sample has completely and stably filled sampling fluidics on a test strip. This determination is made before initiating measurement of the fluid sample, to ensure that a measurement is not conducted on an inadequate sample.

One solution to the challenges described above in the background section is a bodily fluid analysis test strip-part of a bodily analysis system—that is configured to address these issues (e.g., fluidics size, shape and/or materials), and enhance the operation of the bodily analysis system for a given fluid, such as saliva. The assignee of the present application described such a test strip in U.S. Provisional Patent Application No. 62/872,339, referenced above.

Another possible solution for some of the challenges of point-of-care testing of saliva and other bodily fluids would be for some part of the bodily fluid analysis system to determine that a collected sample is sufficient for testing. Typically, measurement initiation is triggered on disposable test strips when sample fluid bridges a gap between two electrodes, thus completing a circuit and indicating that enough sample has entered the test strip. The electrodes are typically located at the opposite end of the test strip from the sampling fluidics (i.e., the end of the strip on which the sample is collected). This solution is appropriate for more consistent fluids, like blood, where flow through the test strip fluidics is relatively uniform and predictable.

Due to the variable (and potentially high) viscosity of saliva, however, bridging between two electrodes on a test strip can occur without complete channel filling (see FIG. 1B) or can be transient in nature. As such, additional time may be required to allow a sample fluid to adequately fill a test strip to allow for measurement of the sample. It can be very challenging for a user of such a test strip/test system to determine whether enough saliva has been collected on a given test strip to allow for an accurate measurement.

The present application describes various embodiments and features of a method, device and system for analyzing a sample of saliva or other bodily fluid (e.g., sweat, blood, etc.). Specifically, the embodiments described herein provide a method of assessing a saliva sample to determine if it is sufficient (and has sufficiently filled microfluidics of a test strip) to allow for an accurate measurement of the sample. Although the following disclosure focuses on the analysis of saliva, the embodiments described below, or variations of those embodiments, may be used for analysis of any other bodily fluid, such as sweat, blood, urine or the like.

Referring to FIGS. 1A-1C, the tip of a saliva analysis test strip 10 is shown in three different states of fluid sample collection. FIG. 1A shows the test strip 10 with its microfluidic channel 12 empty-in other words, no fluid sample has been collected. Also shown are the three electrodes 14 of the test strip 10.

FIG. 1B shows the test strip 10 with the microfluidic channel 12 partially filled with a saliva sample 16 (or other bodily fluid sample in alternative embodiments). As mentioned above, the image in FIG. 1B demonstrates one of the challenges with using a typical test strip 10 in a point-of-care saliva analysis—i.e., the sample 16 may bridge across the electrodes 14, even though it is not enough sample 16 to fill the channel 12. FIG. 1C shows the channel 12 completely filled with the saliva sample 16. Again, with a typical test strip 10, it may be difficult or impossible to tell the difference between the partial filling of FIG. 1B and the complete filling of FIG. 1C.

Referring now to FIGS. 2A and 2B, one embodiment of a method for assessing a saliva sample 26 on a test strip 20 is illustrated. In this embodiment, the test strip 10 includes a substrate, a microfluidic channel 22 (or "sampling microfluidics"), and three electrodes 24a, 24b, 24c (although alternative embodiments may include more than three). The electrodes 24a, 24b, 24c have fixed functions and are positioned at different locations along the length of the test strip's microfluidic channel 22. Prior to and during sample measurement, a first electrode 24a applies a periodic signal, a second electrode 24b monitors the signal, and a third electrode 24c acts a reference electrode. The monitored signal is evaluated by a handheld sample analysis device (not pictured) that is coupled with the test strip 20. As the saliva sample 26 is collected in the microfluidic channel 22, it will bridge all three electrodes 24a, 24b, 24c but may continue to shift within the microfluidic channel 22. FIG. 2B shows a line graph that illustrates this sample shifting as an unstable period 30. After the sample 26 stops shifting, the line on the graph 28 stabilizes in a stable period 32. The handheld analysis device monitors the electrode signals to wait for the stable period 32. In this embodiment, measurement of the sample 26 by the analysis device will only begin after a period of consistency in the monitored signal—i.e., the stable period 32—within a pre-determined range of acceptable variation.

Referring now to FIGS. 3A and 3B, in an alternative embodiment, the electrodes 44a-44d of a test strip 40 with a microfluidic channel 42 do not have a fixed function, but instead have their function rapidly reconfigured during sample collection. In this embodiment, the test strip 40 includes four electrodes 44a-44d, but alternative embodiments may have any other suitable number. At any given time, one of the electrodes 44a-44d applies a periodic signal, another of the electrodes 44a-44d monitors this signal, and yet another electrode 44a-44d acts a reference. Which electrode 44a-44d has each function, however, may change as frequently as many times per second. Referring to FIG. 3B, a period of consistency in the monitored signal within and between electrode configurations, as shown in the line graphs 45, 46, 47, is necessary prior to measurement initiation. In addition to the benefits of the method described above, this embodiment of the method allows sample flow rate and viscosity to be determined, by assessing time-of-flight of the sample. These parameters may optionally be used in a saliva measurement algorithm, for example to adjust sample analysis results for flow rate and/or viscosity.

In another embodiment, illustrated in FIGS. 4A and 4B, a biological fluid analysis test strip 50 includes a microfluidic channel 52 and multiple sets of concentric electrodes 54a-54d in the microfluidic channel 52. Each set of electrodes 54a-54d is configured to independently assess signal fluctuation during sample collection. As illustrated in the line graphs 55, 56, 57 of FIG. 4B, a period of consistency in the monitored signal of each set of electrodes 54a-54d, within a pre-determined range of acceptable variation, is required prior to initiation of the sample measurement. The difference between the signal measured by each set of electrodes 54a-54d during sample collection may be used to assess sample flow rate and viscosity. Additionally, this electrode structure may reduce the sensitivity of sample measurement to the volume of sample within the microfluidic channel 52 or localized variation within the microfluidic channel 52.

For all method embodiments described herein, the ongoing signal monitoring, prior to and during sample collection, may be used to communicate the current state of the sample being collected (e.g., sufficient fluid, insufficient fluid, faulty sample) to a user, through noise, vibration and/or a visual signal on the testing system or a connected device.

FIG. 5 illustrates a method 60 for collecting a saliva (or other bodily fluid) sample using a test strip inserted into a saliva analysis device. FIG. 5 depicts a series of method steps 62 and a corresponding series of instructions 64 provided to a user on a display screen 69 of a handheld biological fluid analysis device 61. Following the method steps 62 first, according to this embodiment, the user first initiates the test system 66 (e.g., the handheld device 61). Once a test strip 63 is inserted into the handheld device 61 and a sample is collected on the test strip 63, the system initiates fluid detection 70. If the fluid signal is not stable, fluid detection continues 74 until a stable signal is detected. If it is not detected, the user is told that the sample is insufficient. Once a stable fluid signal is acquired, sample measurement is initiated 78. Finally, measurement data is processed, and the system displays one or more results of the fluid sample measurement 82 (saliva or other fluid).

Turning now to how this method appears to the user of the handheld device 61, the series of instructions 64 will be explained. After being initiated, the first step 68 on the handheld device 61 is to display an instruction on the display screen 69, instructing the user to insert a test strip 63 into the device 61. In the next step 72, the user has inserted the test strip 63 and is instructed on the screen 69 to collect a sample. The user then collects the saliva (or other bodily fluid) sample 65 in the sample collection step 76, for example, by collecting saliva directly on the free end of the test strip 63 by applying it to the user's tongue. If insufficient sample fluid has been collected, a visual signal is displayed on the screen of the analysis device (not illustrated), indicating that insufficient sample has been collected. As the sample is collected, the "Collect Sample" signal remains displayed on the screen, as an ongoing prompt to the user to continue to collect more saliva with the test strip 63. Once enough fluid has been collected and consistency has been confirmed by one of the above-described methods, a tone 67 is emitted by the device, and the message displayed on the screen changes to reflect that enough sample has been collected 80. These notifications tell the user that she can stop collecting saliva on the test strip 63. The analysis device then conducts its measurements, as indicated on the screen. When analysis is completed, the results are shown on the device 84.

Although the above description is believed to be complete and accurate, various changes to any of the embodiments and features described herein may be made, without departing from the scope of the invention. For example, the order of method steps may be altered, one or more method steps may be eliminated, and/or one or more methods steps may be added, in any given embodiment.

What is claimed is:

1. A system for assessing a bodily fluid comprising:
    a test strip comprising:
        a microfluidic channel configured to receive a bodily fluid sample;
        a first electrode located at a first location in the microfluidic channel;
        a second electrode located at a second location in the microfluidic channel; and
        a third electrode at a third location in the microfluidic channel; and
    an analysis device configured to:
        apply a periodic signal with the first electrode;
        monitor the applied periodic signal with the second electrode;
        use the third electrode as a reference electrode;
        continue to apply the periodic signal, monitor the periodic signal and use the third electrode as a reference electrode during collection of the bodily fluid sample in the microfluidic channel; and
        determine that the bodily fluid sample is a sufficient volume for analyzing by identifying a period of stability in the monitored periodic signal, based at least in part on the applying and monitoring of the periodic signal,
    wherein each of the first electrode, the second electrode and the third electrode has a fixed function.

2. The system of claim 1, wherein the periodic signal fluctuates depending on a volume of the bodily fluid sample and a movement of the bodily fluid sample through the microfluidic channel, and wherein the analysis device is further configured to require a period of stability in the monitored periodic signal before determining that the bodily fluid sample is sufficient.

3. The system of claim 1, wherein the analysis device is further configured to initiate an analysis of the bodily fluid sample, based on the determining.

4. The system of claim 1, wherein the analysis device is further configured to indicate to a user to collect more of the bodily fluid sample on the test strip based on a determination that the bodily fluid sample is insufficient for analyzing.

5. The system of claim 4, wherein the analysis device is further configured to determine that the bodily fluid sample is insufficient by identifying in the monitored periodic signal a period of instability and/or a period of stability outside of a predetermined range.

6. The system of claim 4, further comprising a bodily fluid analysis device directly connected with the test strip, wherein the bodily fluid analysis device comprises the analysis device, and the analysis device is further configured to indicate to the user by providing at least one of an auditory signal, a vibration, or a visual signal in the bodily fluid analysis device.

7. The system of claim 4, further comprising a separate device wirelessly connected with a bodily fluid analysis device directly connected with the test strip, wherein the bodily fluid analysis device comprises the analysis device, and the analysis device is further configured to indicate to the user by providing at least one of an auditory signal, a vibration, or a visual signal in the separate device.

8. The system of claim 1, wherein the analysis device is further configured to indicate to a user that the bodily fluid sample is sufficient by providing at least one of an auditory signal, a vibration, or a visual signal in a bodily fluid analysis device directly connected with the test strip or a separate device wireless connected with the bodily fluid analysis device.

9. The system of claim 1, wherein the bodily fluid sample comprises a bodily fluid selected from the group consisting of saliva, sweat, blood and urine.

10. The system of claim 1, wherein the test strip further comprises at least a fourth electrode located at a fourth location in the microfluidic channel; and
    wherein the analysis device is further configured to:
        apply a periodic signal with at least some of the first, second, third, and fourth electrodes;
        monitor the periodic signal with at least some of the first, second, third, and fourth electrodes to collect at least one additional monitored signal;
        identify a period of stability in the additional monitored signal; and
        initiate measurement of the bodily fluid sample, based on the identified period of stability.

11. The system of claim 10, wherein the analysis device is further configured to determine a sample flow rate and a viscosity by comparing signals generated with various sets of electrodes.

12. The system of claim 10, wherein the analysis device is further configured to recommend a method for collecting the bodily fluid sample to a user, based at least in part on at least one of the monitored periodic signal or the additional monitored signal.

13. A system for assessing a bodily fluid sample on a test strip, the system comprising:
 a test strip comprising:
  a microfluidic channel configured to receive the bodily fluid sample;
  a first electrode located at a first location in the microfluidic channel, the first electrode having a reconfigurable function;
  a second electrode located at a second location in the microfluidic channel, the second electrode having a reconfigurable function; and
  a third electrode at a third location in the microfluidic channel, the third electrode having a reconfigurable function; and
 an analysis device configured to:
  apply a periodic signal with the first electrode;
  monitor the applied periodic signal with the second electrode;
  use the third electrode as a reference electrode;
  continue to apply the periodic signal, monitor the periodic signal and use the third electrode as a reference electrode while collecting the bodily fluid sample in the microfluidic channel;
  reconfigure the functions of the first electrode, the second electrode and the third electrode, while collecting the bodily fluid sample;
  continue to apply the periodic signal, monitor the periodic signal and use a reference electrode with the reconfigured functions of the first, second, and third electrodes; and
  determine that the bodily fluid sample is sufficient for analyzing, based at least in part on the applied and monitored periodic signals.

14. The system of claim 13, wherein the analysis device is further configured to determine at least one of a sample flow rate and a sample viscosity, by comparing signals generated with various electrode configurations.

15. The system of claim 13, wherein the analysis device is further configured to determine that the bodily fluid sample is insufficient for analyzing and to indicate to a user to collect more of the bodily fluid sample on the test strip.

16. A method of assessing a bodily fluid sample on a test strip, the method comprising:
 applying a periodic signal with a first reconfigurable electrode located at a first location in a microfluidic channel of the test strip;
 monitoring the applied periodic signal with a second reconfigurable electrode located at a second location in the microfluidic channel;
 collecting the bodily fluid sample in the microfluidic channel while continuing to apply the periodic signal and monitor the periodic signal;
 reconfiguring the functions of the first reconfigurable electrode and the second reconfigurable electrode while continuing to collect the bodily fluid sample; and
 continuing to apply the periodic signal and monitor the periodic signal with the reconfigured functions of the first and second reconfigurable electrodes; and
 after monitoring the periodic signal with the reconfigured functions, determining that the bodily fluid sample is sufficient for analyzing, based at least in part on the applied and monitored periodic signal.

17. The method of claim 16, further comprising determining at least one of a sample flow rate and a sample viscosity, by comparing signals generated with the electrodes.

18. The method of claim 16, further comprising, before the determining step:
 determining that the bodily fluid sample is insufficient for analyzing; and
 indicating to a user to collect more of the bodily fluid sample on the test strip.

19. The method of claim 16, wherein the bodily fluid sample comprises a bodily fluid selected from the group consisting of saliva, sweat, blood, and urine.

* * * * *